United States Patent
Grune et al.

(10) Patent No.: US 10,262,028 B2
(45) Date of Patent: *Apr. 16, 2019

(54) SIMULTANEOUS INTELLECTUAL PROPERTY SEARCH AND VALUATION SYSTEM AND METHODOLOGY (SIPS-VSM)

(76) Inventors: Guerry L. Grune, Virginia Beach, VA (US); Douglas R. Plante, Virginia Beach, VA (US); Yuen Sun Tsang, Virginia Beach, VA (US)

(*) Notice: Subject to any disclaimer, the term of this patent is extended or adjusted under 35 U.S.C. 154(b) by 1161 days.

This patent is subject to a terminal disclaimer.

(21) Appl. No.: 13/572,271

(22) Filed: Aug. 10, 2012

(65) Prior Publication Data

US 2014/0143269 A1 May 22, 2014

Related U.S. Application Data

(63) Continuation of application No. 09/896,238, filed on Jun. 29, 2001, now Pat. No. 8,326,851.

(51) Int. Cl.
G06F 17/30 (2006.01)
G06Q 10/10 (2012.01)
G06Q 50/18 (2012.01)

(52) U.S. Cl.
CPC ....... *G06F 17/30424* (2013.01); *G06Q 10/10* (2013.01); *G06Q 50/184* (2013.01)

(58) Field of Classification Search
CPC ............ G06F 17/30424; G06C 50/184; G06Q 50/184
See application file for complete search history.

(56) References Cited

U.S. PATENT DOCUMENTS 5,991,751 A 11/1999 Rivette et al.
6,263,314 B1 7/2001 Donner
(Continued)

FOREIGN PATENT DOCUMENTS

WO WO199855945 A1 12/1998
WO WO200052618 A2 9/2000

OTHER PUBLICATIONS

Kevin G. Rivette and David Kline, Rembrandts in the Attic, ISBN 0-87584-899-0, Copyright 2000, pp. 110 &136, Harvard Business School Press, Boston U.S.A.
(Continued)

*Primary Examiner* — Shew Fen Lin
(74) *Attorney, Agent, or Firm* — Guerry L. Grune; ePatentManager.com (57) ABSTRACT

A system, method, and computer-based logic flow is presented for a web-enabled tool allowing simultaneous intelligent searching, knowledge management based problem solving, valuation, and modeling of intellectual property and scientific information. The system accesses databases containing intellectual property and scientific information. Additionally, the computer-based logic flow utilizes valuation techniques. The system receives user queries and can simultaneously and automatically access an intellectual property database, a scientific information database, a knowledge management based problem solving database, and a valuation based algorithm database to categorize, analyze, and disseminate pertinent information resulting in modeling and displaying the results. The invention also allows for the simultaneous display of intellectual property and valuation information in one model as well as the non-intellectual property protected scientific information. The user can easily, quickly, and accurately obtain information vital to determining the content, value, and direction of current and future specific technology trends.

8 Claims, 5 Drawing Sheets

Database search using SIPS-VSM (56) References Cited

U.S. PATENT DOCUMENTS

| | | | |
|---|---|---|---|
| 6,345,235 | B1 | 2/2002 | Edgecombe et al. |
| 6,393,406 | B1 | 5/2002 | Eder |
| 6,490,569 | B1 | 12/2002 | Grune et al. |
| 6,499,026 | B1 * | 12/2002 | Rivette .............. G06F 17/30011 |
| 6,556,992 | B1 | 4/2003 | Barney et al. |
| 6,963,920 | B1 | 11/2005 | Hohmann et al. |
| 7,716,060 | B2 * | 5/2010 | Germeraad ............ G06Q 10/10 702/1 |
| 2001/0034695 | A1 | 10/2001 | Wilkinson |
| 2001/0042034 | A1 | 11/2001 | Elliott |
| 2002/0002524 | A1 * | 1/2002 | Kossovsky ............ G06Q 10/10 705/36 R |
| 2002/0035499 | A1 * | 3/2002 | Germeraad ............ G06Q 10/10 705/310 |
| 2002/0077835 | A1 | 6/2002 | Hangelin |
| 2002/0184130 | A1 | 12/2002 | Blasko |

OTHER PUBLICATIONS

Patrick Thomas & G. Steven Mcmillan, Using Science and Technology Indicators to Manage R&D as a Business, Engineering Management Journal, Sept 2001, pp. 9-14, vol. 13(3), The Institution of Electrical Engineers, United Kingdom.

* cited by examiner

Figure 1. Programming logic scheme for SIPS-VSM Searching

Figure 2. Overall logic flow for SIPS-VSM

Figure 3. Database search using SIPS-VSM

Figure 4. User-defined Search

Figure 5. Computer-Based Hierarchy for SIPS-VSM ized U.S. patent
SIMULTANEOUS INTELLECTUAL PROPERTY SEARCH AND VALUATION SYSTEM AND METHODOLOGY (SIPS-VSM)

This application is a continuation of and claims the benefit under 35 USC 120 of commonly assigned U.S. patent application Ser. No. 09/896,238 filed on Jun. 29, 2001 entitled "Simultaneous Intellectual Property Search and Valuation System and Methodology (SIPS-VSM)" and under 35 USC 365(c) of PCT/US02/20601 filed Jun. 27, 2002 of the same title. Both applications are hereby incorporated entirely by reference.

BACKGROUND OF THE INVENTION

Description of the Prior Art and Background

Patents are important in business strategies as companies look to exploit opportunities to increase revenues. Patent strategies help companies determine what research and development projects to continue funding, with what companies cross-licensing may be advantageous, which technology areas are in need of additional patent protection from competitors, and which technology areas are potentially lucrative. Trademarks and copyrights also offer similar, albeit less protection in the intellectual property arena.

When a company attempts to maximize its investment in R&D, it is important to understand the technologies that its competitors are exploring and developing. There are several internet or web-enabled tools that allow for the search of patents such as the United States Patent and Trademark Office (USPTO) Automated Patent System (APS) and Delphion's Intellectual Property Network (IPN). Additionally, Aurigin's and Delphion's tools allow for the search and analysis of patent information by mapping or clustering. This allows a user to understand how a group of patents or claims are related.

In addition to mapping or clustering patents, it is useful to know the value of the patents. Aurigin's PCT application WO 98/55945 incorporated in this application by reference provides a method for determining the value of a company's patents by dividing the total revenue from a group of patents by the number of patents in the group. This does not allow for the valuation of another company's patents because revenue dollar information per patent or group of patents is often not available to those outside of the company who may not own the patent rights. An alternative valuation method is used by pl-x. pl-x's method to valuate patents relies on establishing technology sectors and "pure-play" microcap companies that are within a technology sector. A "pure-play" microcap company has all its value in a single product. The values of these companies within a technology sector provide a reasonable value for the technology itself. Along with other variables, the Black-Sholes Pricing model, and options theory or the discounted cash flow method, pl-x is able to determine a value for the patent.

When researching a technology, patents are not the only source of information. Scientific publications provide large and valuable quantities of information on new technologies. SciFinder found at www.cas.org is a web-based search engine for abstracts from many scientific publications. Additionally, trademarks and copyrights can be found within specific government (.org) websites.

Web-based tools provide easy access from various locations; thus, they are a preferred method of searching. It is essential that web-based tools are easy for a user to understand and utilize. Many websites including Ask Jeeves at www.ask.com allow queries using natural or plain English and not Boolean text. This method is simpler and more straightforward for a user as the user may perform queries based on commonly used language.

Researching, searching, and implementing a patent strategy is most effective if a company knows what patents already exist in a technology sector. It is important to know whether the intellectual property and the technology sector more generally is a potential source of revenue for a company, for it is not appropriate to invest money in an already protected intellectual property (patented or otherwise) idea or an idea that is based on old technology. Additionally, patent strategy is enhanced when a company's own patents and those of its competitors can be valued based on non-subjective criteria. A tool that combines valuation techniques with patent mapping and non-patent, scientific information searching capabilities via the web along with a web-enabled Knowledge Management system would provide a method for enhancing a company's ability to develop its patent strategy as well as value its existing intellectual property portfolio.

There are also available web-enabled and otherwise enabled search systems with large databases and added intelligence that provide solutions to existing technology related problems. One such system, known as the Invention Machine™, uses revolutionary semantic processing technology to harness the power of linguistic reasoning algorithms to deliver precise solutions to user problems. The technology developed understands the relationships between words and can extract all key concepts in a document. It automatically builds a high-precision semantic index in a problem-solution format populated by specific and relevant answers to user queries. Internet-enabled Knowledge Management products let users in different locations share information and let organizations gather and index important information from sources scattered across the Web. Leading vendors of commercial Knowledge Management (KM) systems include Autonomy, Business Objects, Cognos, Hewlett-Packard, Hummingbird, and Invention Machine. Today's KM products use a number of innovative techniques. For example, the underlying technology is evolving beyond simple Boolean searches so that companies can automatically classify information more usefully and employees can find relevant information more reliably. Two technologies illustrating this trend are Autonomy's Bayesian probabilistic search-based ActiveKnowledge technology and Invention Machine's semantic-processing technology.

For example, the user may simply query; how does one bond a specific type of metal to a specific type of glass? The robust database combined with the KM system quickly and efficiently yields a reply, complete with a referenced bibliography (if one exists), describing and illustrating how this problem has been solved in the past.

There is a need for a user-friendly, web-based tool that allows a user to input queries in plain-language and can search and map patents while simultaneously valuing those patents. Additionally, there is a need to combine the searching of patents and non-patent, scientific information in one query. There is also a need to access Knowledge Management systems' responses to queries and link those responses to published, evolving intellectual property databases as well as to their own internal scientific and engineering databases. Finally, there is a need to model the results of the query in such a way that a user may display and/or map (by an audio/visual means in two or three dimensions) solutions to such queries from; patents contained within specific evolving intellectual property databases, technological publications contained within evolving scientific and engineering databases, and evolving Knowledge Management based systems. The end result audio/visual display and/or model needs to include the capability to value related and pertinent intellectual property (usually patents, but could be trademarks or copyrights), while simultaneously displaying the non-patent technology information.

BRIEF DESCRIPTION OF DRAWINGS

FIG. 1 describes the programming logic scheme used for developing SIPS-VSM. The server computer executes SIPS-VSM to run its intelligent searching engine. The intelligent searching engine will access and retrieve information from the databases of knowledge management, valuation, IP, and technology literature. After information related to query is retrieved, data is sent to SIPS-VSM's utilities. One of the utilities will group IP/Non-IP results per the user's specifications. For example, a user may decide to group his results according to subject, publication date, assignee, etc. Another utility will value IP. Knowledge management utility enables users to find solutions to problems by semantically analyzing documents by breaking sentences into noun-verb-adjective trees and then applying such tools as synonym indexes. After SIPS-VSM executes its utilities on the retrieved data, the data is processed into the modeling utility. The modeling utility will display results of interest to the user, concluding the use of SIPS-VSM.

FIG. 2 is the basic process flow utilized by the SIPS-VSM software tool. The user utilizes a graphic user interface to enter a plain-language query via the web. When the search begins, databases are accessed and searched for information that is relevant to the query. Various databases contain the patent information, the information for valuing those patents, knowledge management (KM) based problem solving information, and technology literature. Next, the information from the databases is combined, and the information that is irrelevant to the query is removed. The information is formatted and modeled for display. Finally, the information relevant to the query is displayed to the user in visual or audio format. The visual format may be landscape maps, hyperbolic trees, or alternative graphic displays per the user's instructions. The audio format presents the user with identical information to that presented by the visual display.

FIG. 3 describes the searching of the databases. The user enters the query, and the search engine mines the various databases for information relevant to the query. The user may limit the search to any combination of the databases. For example, the user may choose to search only the patent and valuation databases, or the user may choose to search the technology literature, patent, and valuation databases. Also, the user may choose to search only one database or all four of the databases. Alternatively, the user may decide to begin the query by an interrogative phrase requesting a solution to an existing technology dilemma. This request requires a different starting point for the SIPS-VSM tool and a different initial database to access, but once the relevant information has been identified and collected, it is displayed to the user according to the user's specifications in an identical manner.

The user's options while searching and analyzing results are numerous. FIG. 4 describes how a user may choose to use SIPS-VSM to search for information. Initially, the user enters a plain-language query into the user interface and defines which databases to search. SIPS-VSM searches the databases, identifies the relevant information to the query, and displays and values the results in the resulting files in an audio/visual format. The user may save or print the results files generated from the query. Then the user may choose to enter a new query, refine the current search, or exit the SIPS-VSM tool. If the user chooses to enter a new query, the user is returned to the beginning of the process. If the user chooses to refine his search, the user will enter a new query. The results from the refined query are a subset of the previous query's results. Again, the user may save or print the results of the resulting files. After refining a search, the user may begin a new search, refine the search again, or exit the SIPS-VSM tool.

SUMMARY OF THE INVENTION

Figure 1:
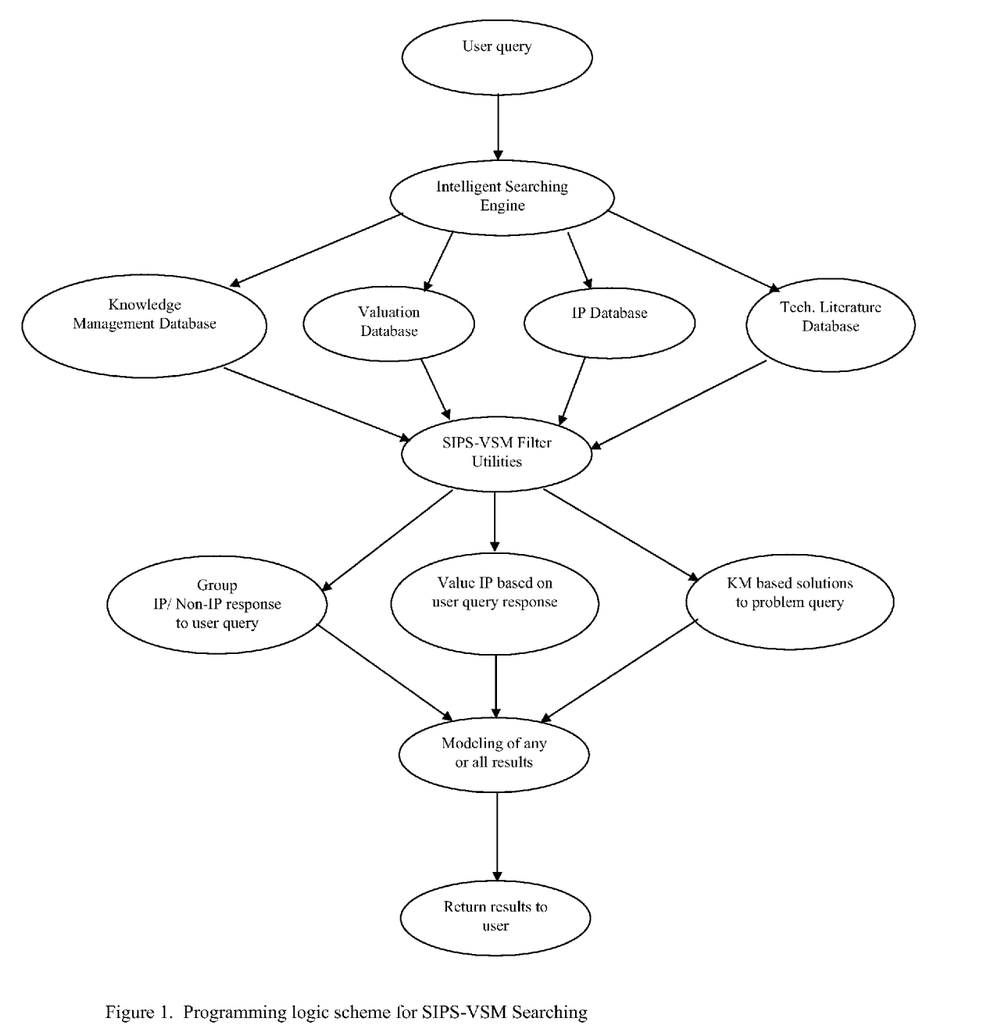
Figure 2:
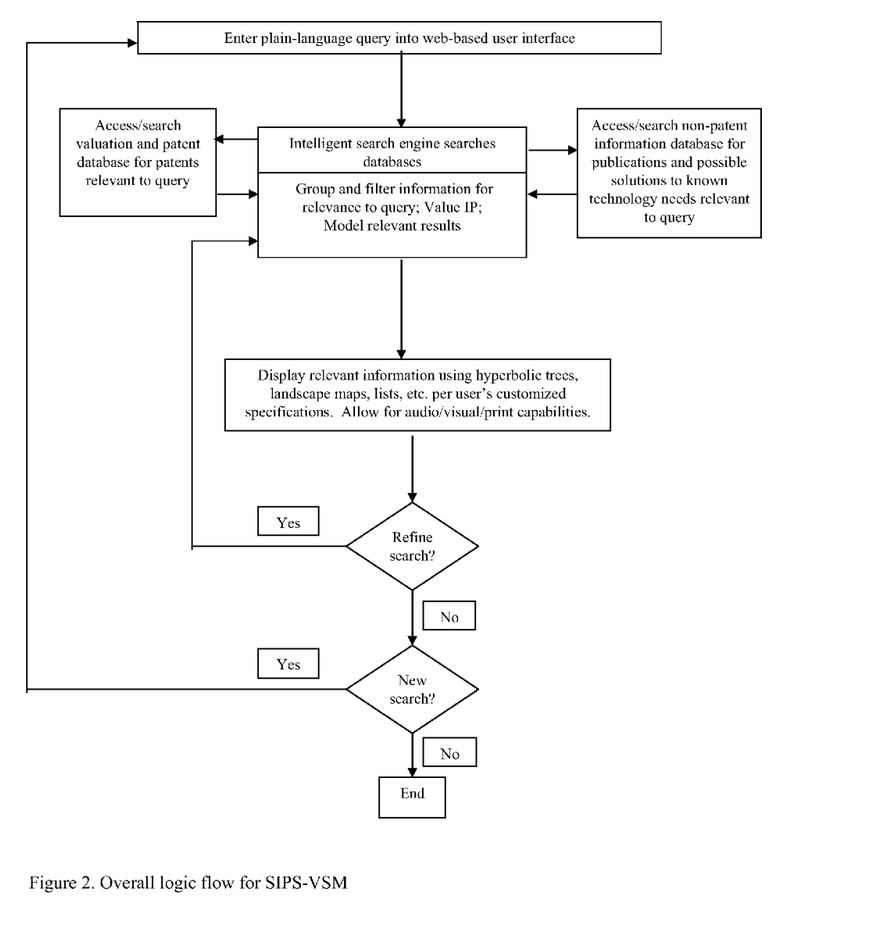
Figure 3:
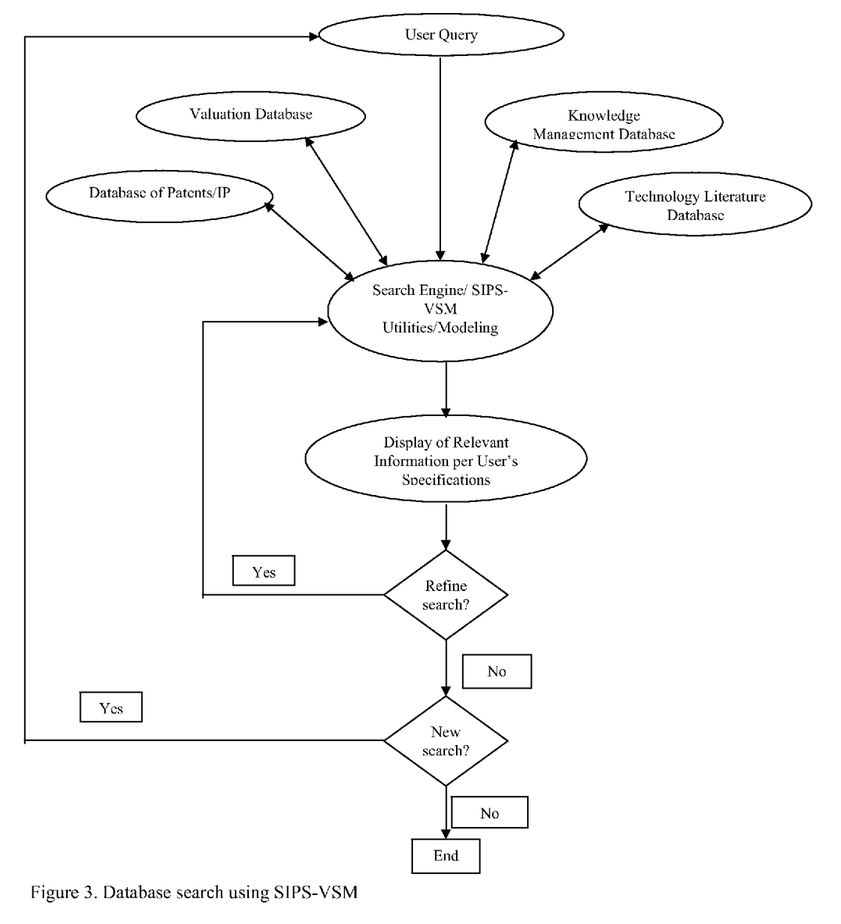
Figure 4:
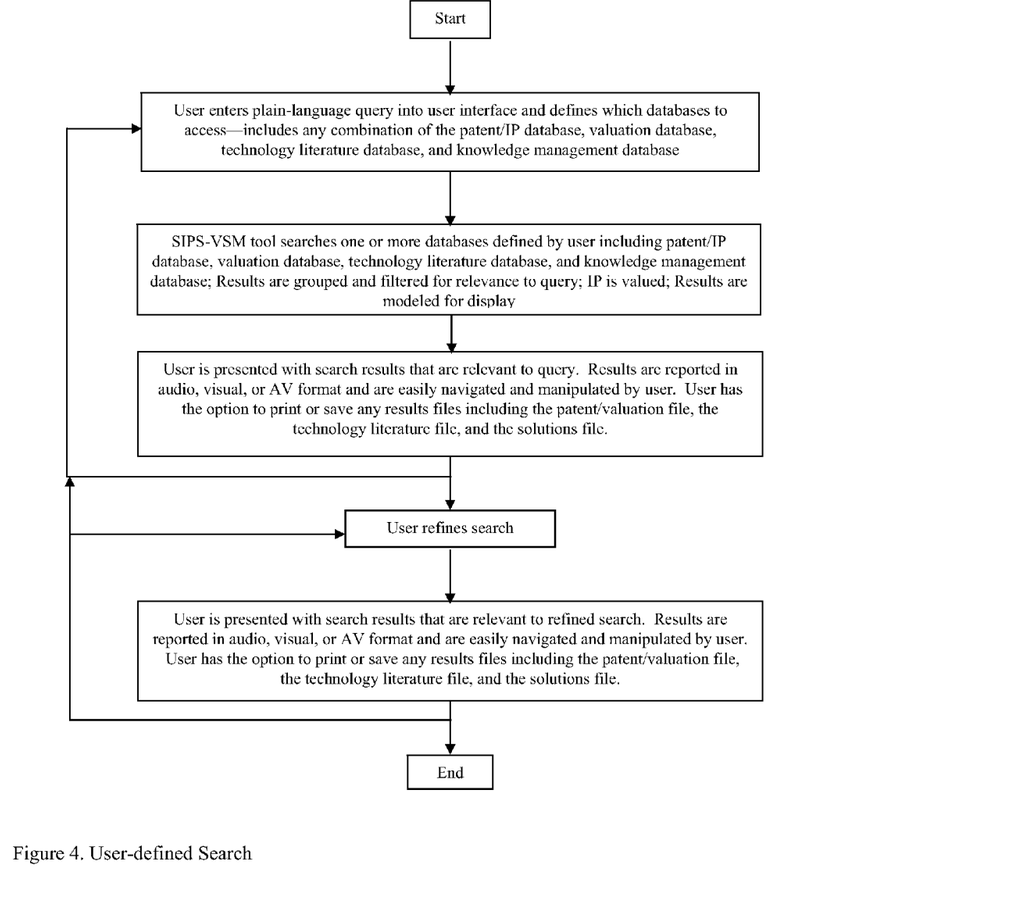
Figure 5:
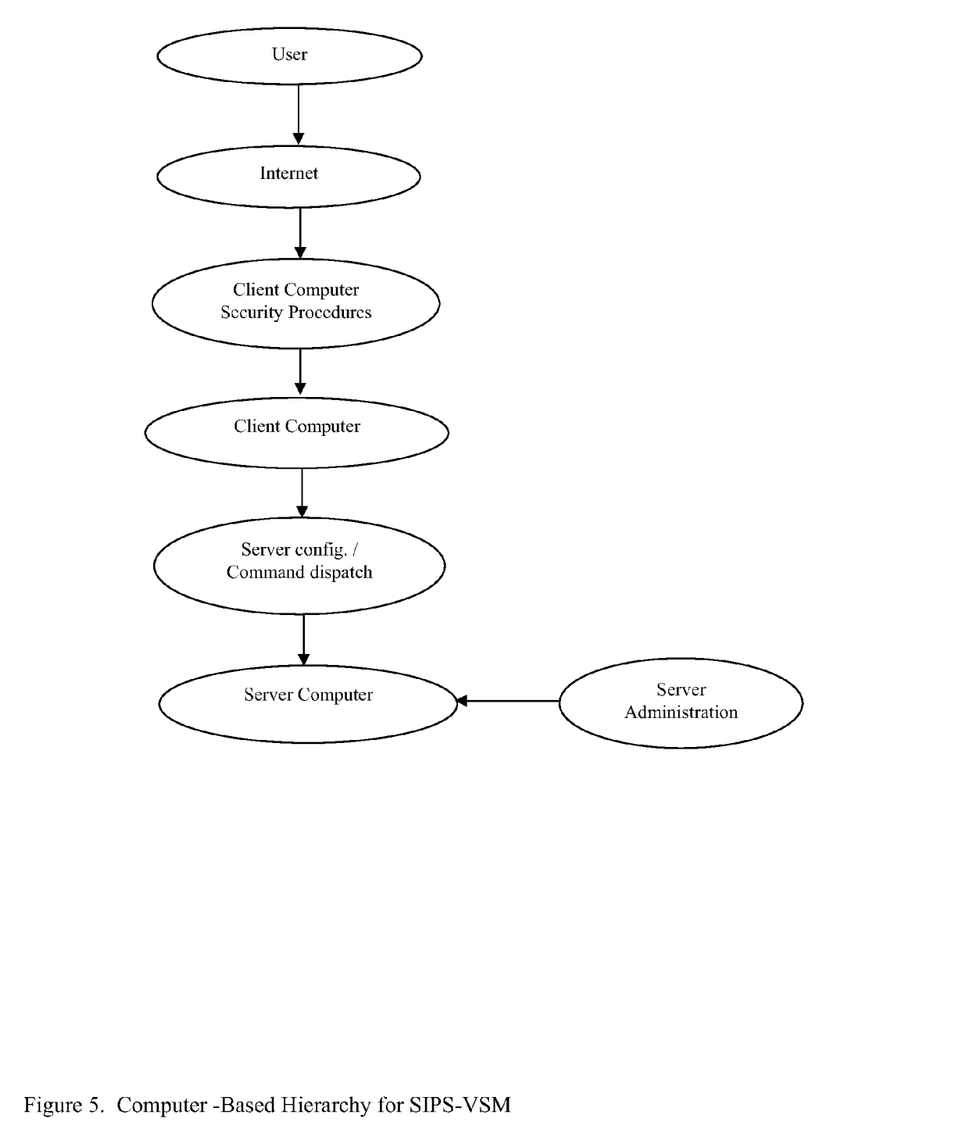
FIG. 5 describes the hierarchal path from the user to the server computer. SIPS-VSM is a web-enabled tool, thus the user will connect to a client computer via the Internet. The client computer will use security procedures to prevent users from inappropriately gaining information from the server computer. Commands from the client computer will dispatch to the server computer, which executes the intelligent search engine of SIPS-VSM. Server administration will allow access to manage the databases stored within the server computer.

The present invention is a web-enabled tool that allows for
  a) simultaneous intelligent searching,
  b) problem solving through Knowledge Management systems,
  c) valuation of intellectual property, and
  d) systematic modeling of intellectual property and scientific information through a device such as a graphic user interface.

The invention also allows a user to selectively perform operations related to a-d regarding specific areas of intellectual property within one document or within several related documents.

This invention is based on the need and goal of any research and development organization, that is, allowing for valuation of existing and future technology so that resources may be properly directed. In today's global economic environment, R&D expenses are more difficult than ever before to manage due to the high costs associated with employees with proper knowledge skills, laboratories, government regulatory bodies, and the shortened time required to reach developed or developing markets with the resultant product based on these R&D activities.

The present invention merges already developed web-enabled and otherwise enabled computer-based Information Technology (IT) tools so that a user may instantly determine solutions to technological problems, access all pertinent intellectual property and associated technological publications and optionally value such intellectual property either simultaneously or distinctly. Valuation may be accomplished by a number of methods including Black-Sholes pricing theory and Discounted Cash Flow models and derivations thereof. In this manner, the invention provides a type of artificial intelligence in both searching and decision making capability. For example, the user may want to know how to make the most efficient fuel cell with the most optimal catalyst, fuel source, and materials of construction. The user would want to determine what patents exist in arriving at that solution, determine what non-patented technological publications are available, review all of this information and extract the pertinent information. The user would also want to instantly value the intellectual property (IP) that exists to determine which avenues of technology are valuable, which areas are available for licensing, which areas have not been protected by intellectual property, etc. Just as important would be to understand which areas have little or no value in today's marketplace and directing resources away from developing technology in that area. This streamlines available resources in a manner that heretofore has been accomplished by lengthy meetings and discussions using subjective means without the use of the more objective-oriented means of the present invention.

In this manner, it is understood that indecision about how to (or even if one should) proceed in the research and development of a certain technology, is removed or at the very least, significantly lessened.

A starting point for this analysis may be to first value known intellectual property and then systematically search all related IP protected and non-IP protected technology. Alternatively, the starting point may be the aforementioned query regarding how to solve a technological problem. Another starting point would allow the user to begin the analysis by accessing known IP protected technology and expanding the search and retrieval methodology from that point.

The present invention allows for a user to determine an arbitrary starting point for the analysis, while allowing for a final audio/visual means to quantitatively analyze each technology (protected or not protected by IP) in terms of specific type, specific quantity, specific terminology, and specific value or any other pertinent and related category contained within various databases. These are the aforementioned databases of patents contained within specific evolving intellectual property, technological publications contained within the evolving scientific and engineering literature, and evolving Knowledge Management based systems.

In addition, the present invention includes model mapping and valuing either singularly or simultaneously which can provide a direction of increasing or decreasing value on the same or different map.

DETAILED DESCRIPTION OF THE INVENTION

Intelligent Searching

Intelligent searching allows a user to enter a query via a client computer that is connected to a server computer on a global area network. Intelligent searching also provides a user access to the stored intellectual property and scientific information contained in the various databases.

The user utilizes a client computer to access the server. The client computer accesses a server computer, and both are connected on a global area network. The server system accesses the databases containing intellectual property and non-intellectual property scientific information upon receiving appropriate operator commands. The databases are mined for appropriate information that is of interest to the user. The mined information is then returned through the server to the client computer for the user's access.

To begin a search, a user enters a query into an easy to use, web-enabled interface in plain or natural English or other language that does not require the use of Boolean text. Searches may include but are not limited to keyword, inventor, patent-shoe number, field of search, date of patent, cited reference, current assignee, field of technology, or solutions to scientific or engineering problems.

Knowledge Management (KM) and Problem Solving

Today's KM products use a number of innovative techniques. For example, the underlying technology is evolving beyond simple Boolean searches so that companies can automatically classify information more usefully and employees can find relevant information more reliably. Problem solving techniques allow for inexperienced users to access information that previously only experienced individuals understood or knew. Two technologies illustrating this trend are Autonomy's Bayesian probabilistic search-based ActiveKnowledge technology and Invention Machine's semantic-processing technology.

Users can submit a document in a query form and ask ActiveKnowledge to find other documents on similar topics in databases and on the Internet. Autonomy's technology analyzes the frequency of character strings in documents that it finds to determine which strings address the same topics as the submitted document.

Invention Machine released its first semantic-processing engine, TechOptimizer, in 1995. Several companies, including Intel, have used it to find information that helped them develop new products. The company also uses its technology in new products, Knowledgist and CoBrain, for the individual and the enterprise, respectively. The software semantically analyzes documents by breaking sentences into noun-verb-adjective trees and then applying such tools as synonym indexes.

The present invention and resulting program has the capability to utilize either the Bayesian probalistic search and/or the semantic-processing technology in providing the user with the desired result(s).

Valuation

The program of the present invention may use a modified Black and Sholes Options Pricing model, market variables, options theory, or discounted cash flow to value patents. An example valuation method is the Technology Risk/Reward Unit (TRRU®) method used by pl-x (the patent and license exchange). The variables used in the pricing model include the time until the product is ready for launch, the average market value of companies that are in the patent's technology sector, the variance of company valuations in the patent's technology sector, the patent's expiration date, the cost to bring the product to market, and the 30-day government T-bill rate. These variables are inserted into a modified Black and Sholes model to calculate the present value of the patent. The patent's present value is then modified based on the number and exclusivity of the licensing agreements the company plans to offer.

An alternative patent valuation method includes the discounted revenue valuation patented by pl-x. This method allows a user to value a patent that may not fit into specified technology sectors or drugs that require FDA approval. It requires the input of several variables from schedules that incorporate the breadth of the patent's claims, the potential size of the invention's market, and the regulations that surround the invention's technology.

An additional method, that is similar to the pl-x discounted revenue valuation method is discounted cash flow (DCF). This is a traditional method of valuing property, including IP. The DCF method relies on a subjective determination of the present value of the property, for example a patent. The patent's value is then determined using DCF analysis which takes into account, among many variables, the life of the patent, interest rates, present value, and inflationary factors.

Patent and Non-Patent Information

Patent and non-patent scientific information, such as journal articles, is stored in databases that are accessed by the SIPS-VSM intelligent search engine. The information retrieved from the patent database is relevant prior art to the user's query. The scientific information contained in the non-patent information databases may include published papers or journal articles. Again, the search engine mines the databases for information that is relevant to the user's query.

SIPS-VSM Utilities

The SIPS-VSM utilities portion of the tool filters and groups all information as well as values the patent information. The filter removes information that is irrelevant to the query, or it includes information that is relevant to the query. The filter operates using an SQL programming language or an alternative programming language. The utilities also value the patent information. The relevant information is grouped according to topic, inventor, value, etc. for modeling. Aurigin Systems Inc. describes grouping of related objects in its PCT/US00/05080 application.

Modeling of Results

The relevant results are modeled for display. This may require information to be ordered, tabulated, or otherwise formatted for each type of visual or audio display specified by the user. Topographical mapping is a method of modeling and is described below. Visual mapping of information in 2-D and 3-D format is demonstrated at www.antarcti.ca. Adding color-coding may enhance visual maps. A color-coded "Mutual Fund Map" at www.smartmoney.com is an example of how color is used to distinguish mutual funds based on performance. The present invention utilizes the same or similar technique to distinguish IP values on a topographical map such as provided by Aurigin's landscape plots.

Display of Results

Patent and Claim Information

The program allows for simultaneous modeling of the valuation and intellectual property results. The results may be displayed in various graphical formats. Hyperbolic trees allow for the display of information on a hyperbolic plane using a focus plus context technique. The center of the tree is called a root, and the branches of information related to the root are displayed in the hyperbolic plane. The focus is easily shifted to a different part of the hyperbolic tree using a pointer device, such as a mouse, to choose a different root center. The program can be used to map patent citations or a patent's claims in hyperbolic tree format. A single patent or claim is at the center of the hyperbolic tree and related claims or patents are the branches connected to the root center. The values of the patents may be displayed next to the patent citations. Alternatively, the user may choose to display the values for patents only when the patent is chosen using a pointer device, such as a mouse. An additional option allows the user to define colors to code patents based on the patent's value. For example all patents that have values between $1,000,000 and $5,000,000 may be green while other colors represent different patent value ranges. This method and analysis could also be extended to valuing other forms of intellectual property.

The program also allows for simultaneous modeling of the patent, associated technology areas, and valuation results on a landscape map. The landscape map divides a general topic into several subtopics that are represented as a different region on the map. For example the topic of fuel cells may be divided into subtopics of sensor, hydrogen, vehicle, and lithium, and each subtopic is represented in a different area on the map. The landscape map is similar to a topographical map. The height of a subtopic's peak in a landscape map corresponds to the number of patents or claims that fall within the subtopic. When more patents or claims correspond to a single subtopic, the peak in that area is higher. Each patent is represented on the landscape map with a marker. The user can assign colors to the markers to represent the valuation ranges that are displayed on the landscape. For example a user may choose green to define all patents that have values in the range of $1,000,000 and $5,000,000 while other colors may represent different patent value ranges.

Alternatively, the patent and claim information may be displayed in a list or graphical format with values corresponding to the patent listing or the patent listing corresponding to color-coded value ranges.

Each of these modeling techniques can be organized by various criteria. The user may define the model by requesting patent technology sector, claim, inventor, or current assignee, while still maintaining the display of the value associated with the patent. The patents may also be organized by calculated value or by any other category the user may desire which is a characteristic available from electronic databases.

Non-Patent, Scientific Information

Non-patent, scientific information such as publications may also be displayed in list, landscape map, or tree format. An abstract or summary of the information contained within the publication allows a user to determine which publications are of interest. The publications can then be accessed for downloading the literature of interest or the specific section of the publication that is pertinent and relative to the search or query.

Electronic Images of Patent and Non-Patent Information

The electronic images of intellectual property and non-protected IP technology literature are available to the user. The user may choose a patent from a list, landscape map, hyperbolic tree, or other visual or audio display and view or hear an electronic version of the patent or other type of intellectual property. Also, a user may view or hear an electronic version of chosen non-IP protected technology literature.

Presentation of Results

Visual results are optionally displayed in split-screen or full-screen format. The split-screen format allows for simultaneously viewing of multiple windows with results of the inputted query. The windows may include lists, hyperbolic trees, landscape maps, electronic images of patents, and summaries and citations of scientific information. For example, a hyperbolic tree displaying the patent citations with overlaid values for the patents, a landscape map displaying groups of patents with color-coded valuations for the patents, a list or summary of the non-patent information, a list of relevant patents, a list of current assignees or inventors that are named on the patents, an electronic image of a patent, and/or a list of the valuations for the relevant patents may all be displayed. The full-screen format allows for display of one or more of the models, images, or listing techniques.

The visual display of results allows the user to easily manipulate and navigate between split-screen and full-screen formats as well as through the windows themselves.

Audible results may be desirable by the visually impaired or others who prefer to listen rather than view information. Audible results use two-way speech or voice recognition to understand the user as well as present the results of the query to the user. The audio and visual results match identically.

What is claimed is:

1. At least one client computer connected to a server computer via a global area network and at least one computer program executed by at least one server computer with a user interface device for valuing intellectual property comprising; at least one server computer that computes data;

wherein said client computer further comprises computer instructions for data including techniques that:

store, retrieve, search, analyze, map and value said intellectual property wherein said intellectual property is obtained from a distinct technology sector such that said client computer provides results that includes; mapping and valuing of said intellectual property according to one or more search criteria specified by a user from one or more public and private databases and wherein said mapping and valuing of said intellectual property also relies on information extracted from problem solving solutions databases as well as scientific and engineering publication databases and wherein said results are provided in an organized manner with assistance from a user interface device and wherein prediction by said mapping results in provision of a value, trend, and existence of current intellectual property and prediction by said mapping of said value, trend, and existence of future intellectual property and wherein any permutation and combination regarding prediction of said intellectual property value includes intelligent searching for, problem solving with, and valuation of said intellectual property, while providing mapping of said intelligent searching and valuation results that is simultaneous and includes a combination of said techniques and wherein said mapping includes features selected from a group consisting of at least one of; colors, numbers, and symbols, wherein said features represent intellectual property value ranges that exist on at least one map and wherein said ranges are colored and change color according to a change in intellectual property values that exist within said ranges wherein valuation of intellectual property is accomplished by simultaneous and instantaneous or simultaneous or instantaneous review of data containing files comprising;

patents, patent applications, and publications as they appear in an electronic patent shoe and otherwise, science and engineering technology literature pertinent to said patents and patent applications and publications from electronic databases, and problem solving solutions pertinent to said patents and patent applications and publications from electronic databases and allows for review and pertinent instant and near instant valuation of said patents and patent applications and publications comprising the steps of;

(1) generation of an electronic patent shoe with access to said science and engineering technology literature review, problem solving solutions review, and valuation techniques comprising minimally a plurality of patents, and optionally said technology literature, and said problem solving solutions;

(2) access to a user interface device to distribute, by use of at least one of a group consisting of an audio, visual, and audiovisual display, in an understandable manner for said user, at least a list of patents and associated pertinent valuations of said list of patents in an instantaneous fashion wherein valuation is accomplished by a number of methods including but not limited to Black-Sholes pricing theory and Discounted Cash Flow models and derivations thereof so that a type of artificial intelligence in both searching and decision making capability exists and subsequent distribution to problem solving solutions and technology literature associated with and pertinent to said list of patents and associated valuations;

(3) pursuant to a command to view and/or hear a next file comprising said patents and associated valuations, said problem solving solutions and said technology literature, retrieval and audible/visual display of at least one of a group consisting of image, text data, and both image and text data representative of at least a portion of said next file; and (4) pursuant to a command to view and/or hear a previous file, retrieval and distribution of at least a portion of said previous file.

2. The client computer of claim 1, wherein said searching is intelligent searching that includes accessing stored information contained within an electronic patent searching and retrieval database, an electronic patent valuation database, a science and engineering technology literature searching and retrieval database, and an engineering and science problem solving searching and retrieval database wherein said intelligent searching provides;

answers to queries regarding any aspect of said intellectual property, including instantaneous determination of a value of said intellectual property;

determination of assignee and assignees;

determination of any prior art associated with said intellectual property;

determination of any inventors associated with said intellectual property;

determination of any patents and patent applications associated with international and U.S. classification of said intellectual property where said intellectual property is itself a patent, determination of any past and current uses and users of said intellectual property.

3. The client computer of claim 2, wherein a combination of techniques including intelligent searching for, problem solving with, and valuation of intellectual property, while providing mapping of said intelligent searching and valuation results that is a combination of results of said searching and problem solving and whereby only intelligent searching together with valuation of intellectual property while providing mapping is obtained.

4. The client computer of claim 1, wherein a second combination for prediction of intellectual property value further comprises problem solving using knowledge management based databases together with valuation of intellectual property based systems while providing mapping of said results.

5. The client computer of claim 1, wherein a third combination for prediction of intellectual property value further comprises electronic patent searching and results of searching for specific intellectual property and simultaneous and instantaneous or near instantaneous valuation of patented intellectual property while providing mapping.

6. The client computer of claim 1, wherein a fourth combination for prediction of intellectual property value further comprises electronic non-patent searching and results of searching for specific non-intellectual property and simultaneous and instantaneous and/or near instantaneous matching of non-intellectual property with patented intellectual property while providing mapping.

7. At least one client computer connected to a server computer via a global area network and at least one computer program executed by at least one server computer with a user interface device for valuing intellectual property comprising; enablement of at least one of a group consisting of both simultaneous and instantaneous, singularly simultaneous and instantaneous review of data contained within data files, said files comprising;

patents, patent applications, and publications as they appear in an electronic patent shoe and equivalent database, science and engineering technology literature pertinent to said patents and patent applications and publications from electronic databases, and problem solving solutions pertinent to said patents and patent applications and publications from electronic databases, wherein said review of said data files provides a comprehensive review to implement instant/near instant valuation of said patents or patent applications and publications further comprising;

(i) generation and access to an electronic patent shoe with instant access to science and engineering technology literature review(s), problem solving solutions review(s), and valuation techniques;

(ii) access to a user interface device to distribute, by at least one of a group consisting of an audio, visual, audiovisual display, in an organized manner, at least a list of patents and associated valuation of said list of patents as well as access and subsequent distribution to problem solving solutions and technology literature involving said list of patents and associated valuations and wherein valuation is accomplished by a number of methods including but not limited to Black-Sholes pricing theory and Discounted Cash Flow models and derivations thereof so that a type of artificial intelligence in both searching and decision making capability exists wherein a user can determine what patents exist in arriving at a solution, determine what non-patented technological publications are available, review all of this information and extract pertinent information to instantly value intellectual property that exists regarding said solution to determine which avenues of technology are valuable, which areas are available for licensing, and which areas have not been protected by previous intellectual property, (iii) pursuant to a command to view and/or hear about a next data file comprising said patents and associated valuations, said problem solving solutions and said technology literature, retrieval of said next data file with at least one of a group consisting of audible, visual display of image, text data and both image and text data representative of at least a portion of said next file; and pursuant to a command to view and/or hear a previous file, retrieval and distribution of at least a portion of said previous file; and;

(iv) capability for a user to scroll back and forth between (ii) and (iii) with no limitations so that reports with and without mapping that captures any desired portion of at least one of a group consisting of visual, audible, and audiovisual displays is provided.

8. The client computer of claim 7 comprising a sequential computation to;

(i) generate a problem solving solutions review with optional instant access to said science and engineering technology literature review, said electronic patent shoe, and said valuation and;

(ii) access to a user interface device to distribute, via at least one of a group consisting of an audio, visual, and audiovisual display, in an organized manner, at least a list of a problem solving solutions review of patents and associated valuations of said list of patents and optionally allowing access and subsequent distribution to problem solving solutions and technology literature associated with said list of patents and associated valuations, and;

(iii) causing, pursuant to a command to view and/or hear a next data file comprising said solutions, said patents from said electronic patent shoes and said technology literature together with values of said patents retrieval of at least one of a group consisting of an audible, visual display of image, text data and both image and text data representative of at least a portion of said next data file; and (iv) pursuant to a command to view and/or hear a previous data file, retrieval and distribution of at least a portion of said previous data file; and;

(v) capability for a user to scroll back and forth between (ii), (iii), and (iv) with no limitations and to provide reports with and without mapping that capture any portion of at least one of a group consisting of a visual, audible, and audiovisual displays.

* * * * *